Nov. 13, 1951  A. L. FOSTER  2,574,822
DRY COTTON PICKER FINGER

Filed Oct. 24, 1949  3 Sheets-Sheet 1

INVENTOR.
Augustus L. Foster
BY
ATTORNEY.

Nov. 13, 1951  A. L. FOSTER  2,574,822
DRY COTTON PICKER FINGER
Filed Oct. 24, 1949  3 Sheets-Sheet 2

INVENTOR.
Augustus L. Foster
BY
ATTORNEY.

Nov. 13, 1951 — A. L. FOSTER — 2,574,822

DRY COTTON PICKER FINGER

Filed Oct. 24, 1949 — 3 Sheets-Sheet 3

INVENTOR.
Augustus L. Foster
BY
ATTORNEY.

Patented Nov. 13, 1951

2,574,822

UNITED STATES PATENT OFFICE 2,574,822

DRY COTTON PICKER FINGER

Augustus L. Foster, Kansas City, Mo., assignor of one-fourth to Oda M. Foster, Kansas City, Mo.

Application October 24, 1949, Serial No. 123,161

4 Claims. (Cl. 56—50)

This invention relates to farm machinery and has to do particularly with cotton picking implements, the primary object being to provide in the apparatus a plurality of movable finger-like elements capable of pulling the bolls from the cotton plant and depositing the same within the implement for removal and further handling as desired.

It is the most important object of the present invention to provide a cotton picker having a plurality of fingers mounted for reciprocation toward and into the cotton plants as the implement is moved along a row thereof, the fingers being provided with shiftable barbs or projections capable of engaging the cotton boll, pulling the same from its plant and dropping the boll into the implement for subsequent removal therefrom.

Another important object of this invention is the provision of a cotton picking implement having parts operable to remove only cotton bolls that are ready for picking while leaving the green cotton on the plant and also operable to remove all cotton bolls ready for picking from their plants without damaging the latter, whereby subsequent operations can take place to again pick cotton that is slower in ripening.

A further object of the present invention is to provide in a cotton picker, suction means capable of collecting the picked cotton from an underslung receiving pan and directing the same to a point of discharge in any desirable manner.

Other objects of the present invention relate to the way in which the aforesaid fingers are arranged in banks for simultaneous reciprocation; the manner in which the fingers themselves are provided with a number of series of prongs movable into and out of a housing therefor as the fingers are simultaneously reciprocated and rotated; and many other more minor details of construction, all of which will be made clear or become apparent as the following specification progresses, reference being had to the accompanying drawings, wherein.

Figure 1:
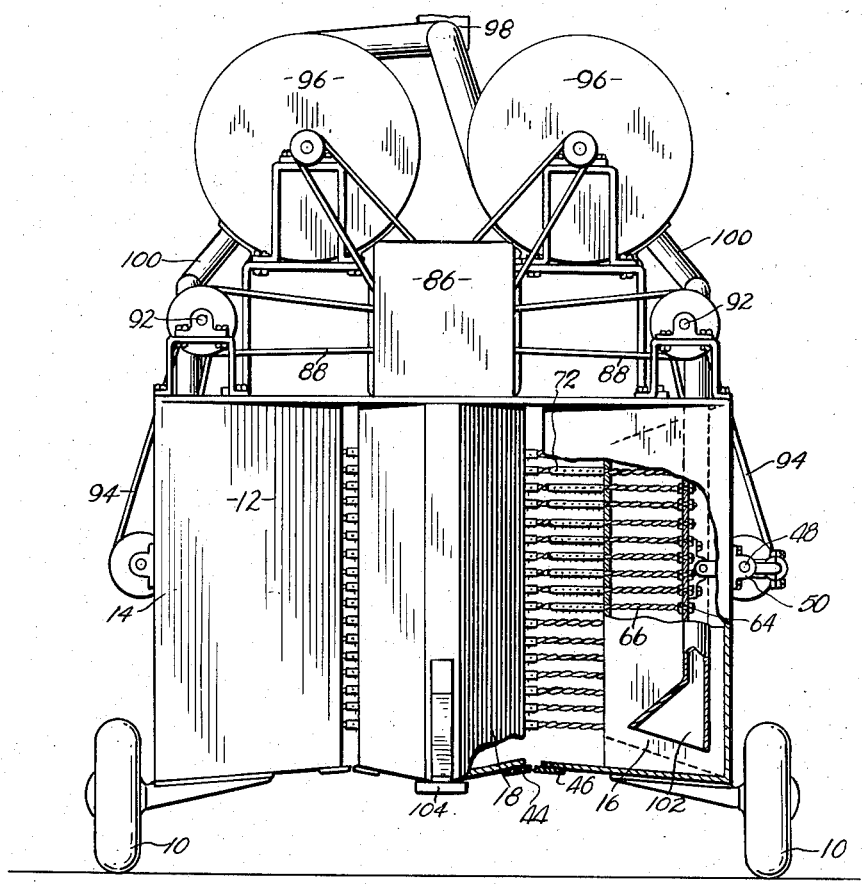
Fig. 1 is a front elevational view of a cotton picker made in accordance with the present invention, parts being broken away to reveal details of construction.

While various attempts have heretofore been made to provide a satisfactory implement capable of picking cotton in the field, for the most part such developments have been entirely unsatisfactory for various reasons. It is necessary in producing a suitable machine, to be able to proceed with the picking operations at any time when a substantial amount of the cotton is ripe and ready for picking even though many of the buds are not in full bloom.

The machine for accomplishing such purposes must be so formed and arranged as to not damage the plant nor the green buds to the end that the slower ripening cotton can be subsequently picked by the same machine. It has been found most difficult to provide cotton picking elements in a machine of this character that will not also either pick the green cotton or damage the same where ripening is retarded or prevented entirely.

Another difficult problem that has been overcome in the machine about to be described, is that of damaging the plant to a point where the green cotton that is not desired to be picked, will continue in its ripening and permit subsequent picking operations.

It is also desirable that a machine of this character not damage the cotton that is picked, nor become temporarily inoperable from time to time because of clogging of the cotton bolls within the mechanism of the implement.

All of the aforesaid difficulties and many others have been overcome in the machine about to be described and it will become apparent that the same embodies a tremendously large number of advantages in successfully picking the crop in a manner never before disclosed so far as I am aware.

The cotton picker illustrated in the drawings is rendered mobile to the end that the same may be towed or otherwise driven through the field of cotton to be picked. Any suitable wheel and axle assembly may be utilized such as a pair of wheels 10 shown and preferably disposed in balanced relationship to an overlying body broadly designated by the numeral 12.

Body 12 includes a front wall having a pair of spaced, vertical panels 14 and 16, both of which angle inwardly as the innermost spaced, vertical edges thereof, are approached. In addition, the front wall of body 10 has a central vertical panel 18 that is substantially V-shaped in cross-section and as is clear in Fig. 4, the two innermost vertical edges of the panel section 18 are spaced from the corresponding proximal innermost edges of the panels 14 and 16 respectively.

Figure 2:
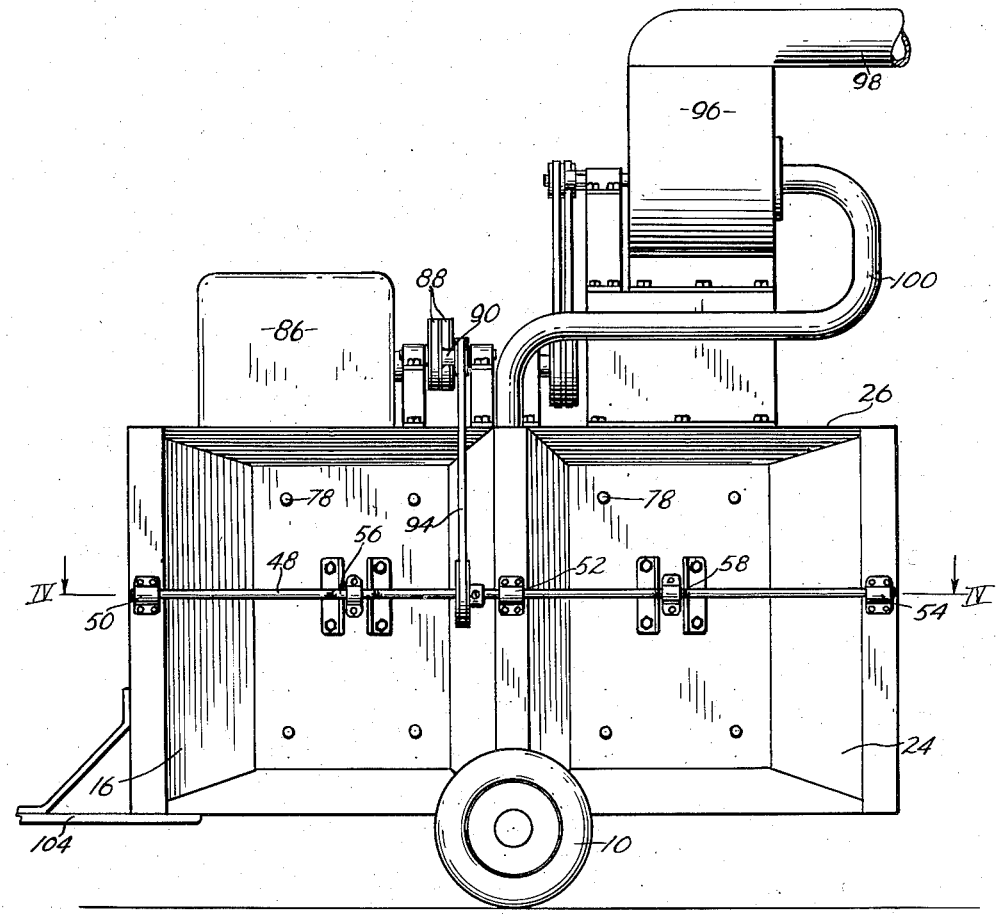
Fig. 2 is a side elevational view thereof.
Figure 4:
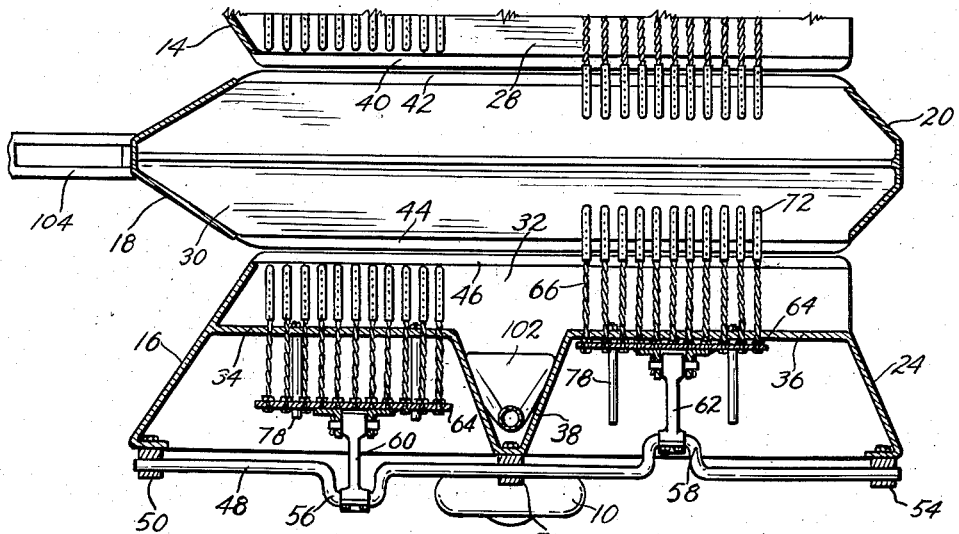
Fig. 4 is a horizontal, transverse, fragmentary, cross-sectional view taken on line IV—IV of Fig. 2.

The rearmost end wall of the body 10 similarly includes a centermost panel section 20, and a pair of side panels 24, (one of which is shown in Figs. 2 and 4) and disposed in much the same manner as the sections of the front wall but, as will hereinafter appear, is more important in the front wall of body 10.

A preferably flat, horizontal top wall 26 for body 10, joins the front and rear end walls in any suitable manner. The bottom of the body 10 is likewise provided with three pan-like panel sections 28, 30 and 32 respectively. The pan section 28 interconnects the end panel 14 and the corresponding end panel 24 and is substantially coextensive in width with the distance between parallel, longitudinal planes through the innermost and outermost vertical edges of said panels 14 and 24. The pan 32 interconnects panel 16 and the other panel 24 in a similar manner, whereby the innermost longitudinal edges of the pans 28 and 32 are spaced and substantially parallel.

The pan section 30 is substantially V-shape in cross-section with the apex edge thereof lower than the outermost longitudinal edges and section 30 is interposed between the proximal innermost edges of pan sections 28 and 32 and interconnects the front and rear end sections 18 and 20 respectively. The outermost longitudinal edges of the pan section 30 are parallel with and spaced from the proximal longitudinal edges of pan sections 28 and 32.

It is also to be noted that each pan section 28 and 32 angles upwardly as the innermost longitudinal edge thereof is approached. Longitudinally, the three pan sections 28, 30 and 32 are substantially parallel with the top 26.

The body 10 is also provided with a pair of side walls, one only of which is shown in Fig. 4 of the drawings. Such side walls interconnect the top wall 26 with the corresponding pan 28 or 30 and also joins each end section 14 and 16 as the case may be, with corresponding end sections 24. Each side wall includes a pair of spaced, flat segments 34 and 36 and a centermost section 38 that is substantially V-shape in cross-section and joins the segments 34 and 36.

The apex edge of the segment 38 extends outwardly from the two segments 34 and 36 and terminates in a vertical plane passing through the outermost vertical edge of panels 14 and 16, as the case may be.

It is noted that both segments 34 and 36 join with the panel 28 or 32 as the case may be in spaced relationship to the longitudinal edges of such pan sections and in parallelism therewith. Thus, the side segment 34 interconnects with the corresponding end panels 14 and 16 intermediate the vertical edges thereof and the segment 36 joins with the corresponding end panel 24 at the innermost vertical edge of the latter. The space between the proximal longitudinal edges of pan sections 28 and 30, is substantially closed by a pair of elongated, resilient strips 40 and 42, mounted directly upon pans 28 and 30 respectively. A pair of resilient, rubber-like strips 44 and 46 are similarly secured to the pans 30 and 32 respectively.

The pair of cotton removing assemblies is mounted on and adjacent to each side wall of the body 10 respectively and since such assemblies are identical, only one will be described.

A crank shaft 48 is carried for rotation on a substantially horizontal axis by bearings 50, 52 and 54 on end panel 16, side section 38 and end panel 24 respectively.

Figure 5:
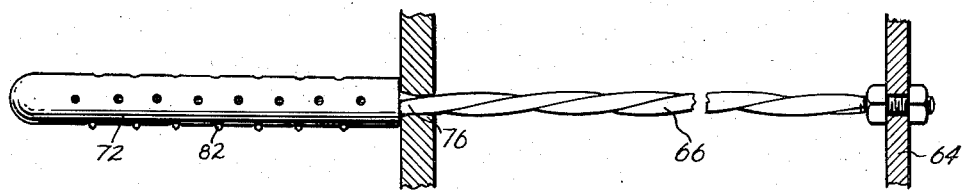
Fig. 5 is an enlarged, elevational view of one of the picking fingers per se.
Figure 6:
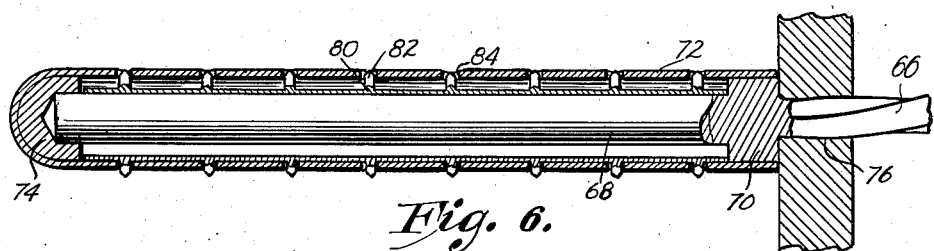
Fig. 6 is a longitudinal, cross-sectional view through one of the fingers on a still further enlarged scale.
Figure 7:
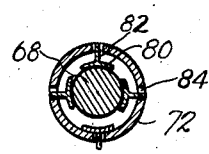
Fig. 7 is a transverse, cross-sectional view through the finger illustrated in Fig. 6.
Figure 3:
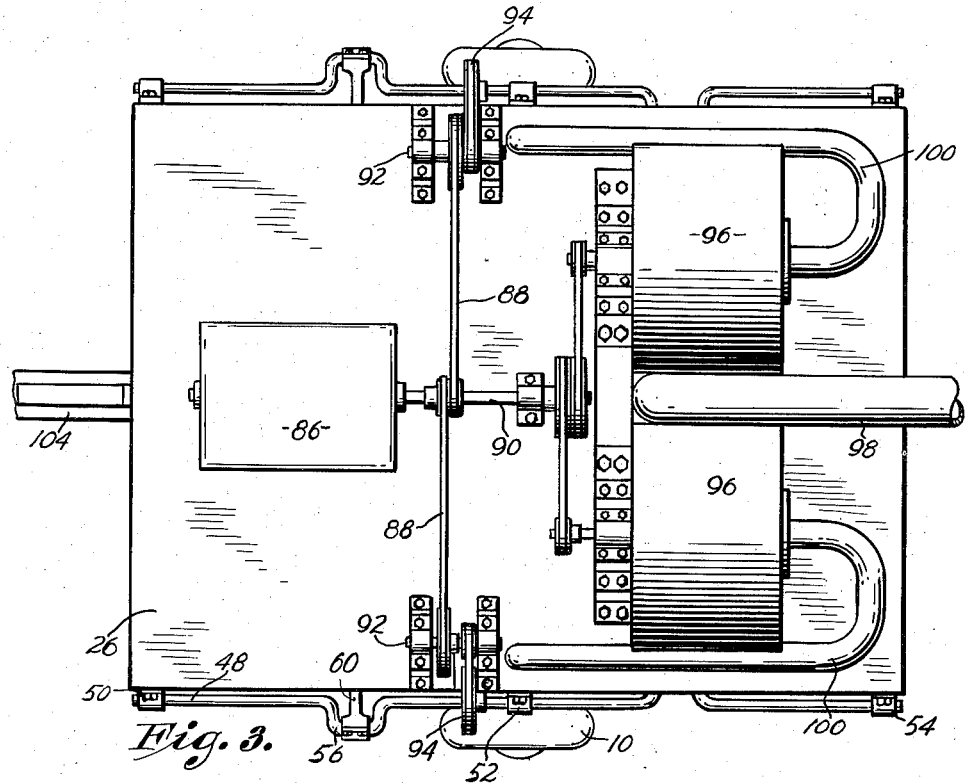
Fig. 3 is a top plan view.

Shaft 48 has a pair of offset portions 56 and 58 for rotatably receiving arms 60 and 62 respectively. Each arm 60 and 62 is pivotally joined on the outermost face of a vertical block 64 having a bank of fingers secured directly thereto of the kind shown in detail by Figs. 5, 6 and 7. Each finger includes an elongated, compound screw 66 having the outermost end thereof secured directly to its block 64. The innermost end of the screw 66 comprises an elongated stem portion 68 that is preferably circular in cross-section as shown in Fig. 7.

Stem 68 has a head 70 of increased diameter at the innermost end thereof for rigidly receiving the innermost end of an elongated tube 72. A block 74 within the tube 72 adjacent the outermost closed end thereof, serves to attach the proximal end of stem 68 to the tube 72 for rotation therewith as a unit.

An internally tapped bore 76 is provided for each screw 66 respectively in the side wall segments 34 and 36. Outwardly extending guides 78 mounted on the side wall segments 34 and 36, slidably receive the blocks 64 as the same are reciprocated by crank shaft 48 to in turn impart reciprocable and rotative movement to the aforementioned fingers.

A plurality of elongated strips 80 of identical character are disposed within the tube 72 and extending longitudinally thereof. As shown in Fig. 7 of the drawing, strips 80 are arcuate in cross-section to conform to the outermost surface of stem 68. Each strip 80 is provided with a series of outwardly extending barbs or prongs 82, preferably integral with strip 80 and preferably in equi-distant, spaced relationship throughout the length of the strip 80.

An opening 84 is provided in the tube 72 for receiving each prong 82 respectively. The prongs 82 are of such length as to extend through the openings 84 and beyond the outermost face of tube 72 when the strips 80 are adjacent the innermost face of tube 72. When strips 80 are resting upon the outer face of the stem 68, the prongs 82 thereof are in a retracted position interiorly of the outermost surface of tube 72. Manifestly, stem 68 is appreciably smaller in diameter than the tube 72 and all of the strips 80 and their series of prongs 82 are floatingly mounted within the tube 72 for free radial movement with respect thereto toward and from the stem 68.

The prongs 82 are preferably flat and have their outermost ends slightly tapered as shown. In Fig. 4, the way in which the bank of fingers in the retracted position adjacent the innermost face of the corresponding side wall segments 34 or 36, are disposed above the corresponding pan 28 or 32, is clearly illustrated. When the bank of fingers are moved outwardly away from the innermost face of the segments 34 and 36, they extend into partial overlying relationship with the pan 30.

Two cranks 48 are arranged and synchronized so that only two diagonal banks of fingers are in the fully extended condition during any stage of operation. Cranks 48 are rotated through any suitable prime mover 86 mounted upon the top wall 26 of body 10. Endless belts 88 couple drive shaft 90 of prime mover 86 with idler shafts 92, that are in turn coupled with corresponding crank shafts 48 by belts 94.

A pair of suction blowers 96 mounted on the top wall 26, are provided with a common discharge conduit 98 and each has an intake pipe 100 extending into the body 10. Conduits 100 extend downwardly through the wall 26 within the corresponding side wall segment 38 and terminate in a funnel 102 spaced above the corresponding pan 28 or 32.

The entire machine is pulled through the cotton field by means of a tow bar 104 and any suitable receiver (not shown) may be provided for collecting the cotton emanating from discharge conduit 98.

It is seen that the cotton picker just above described is capable of accommodating two rows of cotton as the machine is towed through the field. The rows of cotton are deflected toward the resilient strips 40, 42, 44 and 46 by the angularly disposed front wall sections 14, 16 and 18 and as the machine continues to move forwardly, the cotton plants deflect the said rubber strips and pass freely between the proximal innermost edges of pans 28 and 30 and pans 32 and 30. The four banks of fingers reciprocating through the plants as the same pass through the machine, come into contact with the ripe cotton and pull the same from the plant for deposit upon the pans 28, 30 and 32. The outermost rounded ends of the fingers, push the plant aside between the fingers without damage thereto and inasmuch as the fingers are rotating as the same reciprocate, the prongs 82 thereof will be forced outwardly by centrifugal force. As soon as the prongs 82 contact the boll of cotton on the plant, such boll is pulled or jerked therefrom and immediately released to fall freely upon the bottom wall of body 10. The boll of cotton cannot wrap itself around the tubes 72 because of the fact that the prongs 82 and their strips 80, yield inwardly, causing the boll of cotton to be thrown away from the fingers. Furthermore, whenever the fingers strike a relatively hard object such as the stem of the plant or unripened cotton, the prongs 82 will yield inwardly with no consequent damage thereto or to the plant.

It is seen that only ripe cotton that is easily pulled from the plant will be picked by the four banks of fingers and that such cotton is actually jerked from the plant and immediately deposited upon the floor of the body 10. As the machine progresses forwardly, the resilient strips 40, 42, 44 and 46 will maintain a substantially closed bottom for the body 10 and as reduced pressure is created in the two funnels 102, the picked cotton will be drawn upwardly and discharged through conduit 98.

It is appreciated of course, that the number of fingers provided for each bank thereof, may vary to suit differing conditions and it is also understood that more or fewer of the banks may be provided by increasing the overall length of the machine as desired if it is found that the plant must be acted upon oftener than that herein shown in order to remove all cotton therefrom.

Similarly, many details of construction may be made without departing from the spirit of the invention as defined by the scope of the appended claims.

Having thus described the invention, what is claimed as new and desired to be secured by Letters Patent is:

1. In a picking finger, an elongated tube; an elongated, core-like stem telescoped within the tube; means mounting said tube and said stem for reciprocation on the longitudinal axes thereof and rotation on said axes, said tube having a plurality of openings formed therein, said stem having a diameter less than the inside diameter of the tube, presenting a space in the tube around the stem; an elongated prong loosely mounted in each opening respectively for free rectilinear reciprocation on its longitudinal axis toward and away from the stem; and means on the prongs for limiting the extent of movement of the prongs away from the stem, said means being larger than the openings whereby the same strike the inner wall of the tube as the prongs move away from the stem, said stem being within the path of travel of said means for engagement thereby to limit the extent of movement of the prongs toward the stem, said means being floatingly disposed within said space for movement with the prongs toward and away from the stem in response to centrifugal force as the tube and stem rotate.

2. In a picking finger, an elongated tube; an elongated, core-like stem telescoped within the tube; means mounting said tube and said stem for reciprocation on the longitudinal axes thereof and rotation on said axes, said tube having a plurality of openings formed therein, said stem having a diameter less than the inside diameter of the tube, presenting a space in the tube around the stem; an elongated prong loosely mounted in each opening respectively, with the longitudinal axis thereof extending radially with respect to the tube, for free rectilinear reciprocation on its longitudinal axis toward and away from the stem along a path of travel extending radially outwardly from the stem; and means on the prongs for limiting the extent of movement of the prongs away from the stem, said means being larger than the openings whereby the same strike the inner wall of the tube as the prongs move away from the stem, said stem being within the path of travel of said means for engagement thereby to limit the extent of movement of the prongs toward the stem, said means being floatingly disposed within said space for movement with the prongs toward and away from the stem in response to centrifugal force as the tube and stem rotate.

3. In a picking finger, an elongated tube; an elongated, core-like stem telescoped within the tube; means mounting said tube and said stem for reciprocation on the longitudinal axes thereof and rotation on said axes, said tube having a plurality of openings formed therein, said stem having a diameter less than the inside diameter of the tube, presenting a space in the tube around the stem; an elongated prong loosely mounted in each opening respectively, with the longitudinal axis thereof extending radially with respect to the tube, for free rectilinear reciprocation on its longitudinal axis toward and away from the stem along a path of travel extending radially outwardly from the stem; and an elongated strip joining the prongs for limiting the extent of movement of the prongs away from the stem, said strip being larger than the openings whereby the same strike the inner wall of the tube as the prongs move away from the stem, said stem being within the path of travel of said strip for engagement thereby to limit the extent of movement of the prongs toward the stem, said strip being floatingly disposed within said space for movement with the prongs toward and away from the stem in response to centrifugal force as the tube and stem rotate.

4. In a picking finger, an elongated tube; an elongated, core-like stem telescoped within the tube; means mounting said tube and said stem for reciprocation on the longitudinal axes thereof and rotation on said axes, said tube having a plurality of openings formed therein, said stem having a diameter less than the inside diameter of the tube, presenting a space in the tube around the stem; an elongated prong loosely mounted in each opening respectively, with the longitudinal axis thereof extending radially with respect to the tube, for free rectilinear reciprocation on its longitudinal axis toward and away from the stem along a path of travel extending radially outwardly from the stem; and an elongated strip joining the prongs and extending longitudinally of the tube for limiting the extent of movement of the prongs away from the stem, said strip being larger than the openings whereby the same strike the inner wall of the tube as the prongs move away from the stem, said stem being within the path of travel of said strip for engagement thereby to limit the extent of movement of the prongs toward the stem, said strip being floatingly disposed within said space for movement with the prongs toward and away from the stem in response to centrifugal force as the tube and stem rotate, the radial distances from the stem through the longitudinal axes of the prongs to the outermost face of the tube being substantially the same as the length of the prongs plus the thickness of the strip, whereby when the strip is in engagement with the stem, the prongs are fully retracted with respect to the tube and the outermost face of the tube is smooth at the openings.

AUGUSTUS L. FOSTER.

REFERENCES CITED

The following references are of record in the file of this patent:

UNITED STATES PATENTS

| Number | Name | Date |
|---|---|---|
| 101,231 | Cooke | Mar. 20, 1870 |
| 444,801 | Van Dorn | Jan. 13, 1891 |
| 457,743 | Lispenard | Aug. 11, 1891 |
| 993,147 | Briggs | May 23, 1911 |
| 1,119,797 | Bowditch | Dec. 8, 1914 |
| 2,261,572 | Smith | Nov. 4, 1941 |
| 2,279,598 | Smith | Apr. 14, 1942 |
| 2,489,963 | Henley | Nov. 29, 1949 |